US006898896B1

(12) United States Patent
McBride et al.

(10) Patent No.: US 6,898,896 B1
(45) Date of Patent: May 31, 2005

(54) INSECT TRAP SYSTEM

(76) Inventors: William B. McBride, 609 Piedmont Dr., Tallahassee, FL (US) 32312; Scott C. Helzer, 10021 Leafwood Dr., Tallahassee, FL (US) 32312

( * ) Notice: Subject to any disclaimer, the term of this patent is extended or adjusted under 35 U.S.C. 154(b) by 0 days.

(21) Appl. No.: 10/653,647

(22) Filed: Sep. 3, 2003

(51) Int. Cl.[7] ............................ A01M 1/02; A01M 1/08
(52) U.S. Cl. ............................. 43/113; 43/139; 43/107
(58) Field of Search ........................ 43/107, 112, 113, 43/139

(56) References Cited

U.S. PATENT DOCUMENTS

| | | | | |
|---|---|---|---|---|
| 2,778,150 A | * | 1/1957 | Pohlman ...................... | 43/139 |
| 2,931,127 A | * | 4/1960 | Mayo .......................... | 43/139 |
| 3,020,671 A | * | 2/1962 | Potter .......................... | 43/139 |
| 3,120,075 A | * | 2/1964 | Barnhart, Sr. ............... | 43/139 |
| 3,319,374 A | * | 5/1967 | Gawne ........................ | 43/112 |
| 4,037,351 A | * | 7/1977 | Springer ...................... | 43/112 |
| 4,282,673 A | * | 8/1981 | Focks et al. ................. | 43/113 |
| 4,506,473 A | * | 3/1985 | Waters, Jr. ................... | 43/107 |
| 4,519,776 A | * | 5/1985 | DeYoreo et al. ............. | 43/107 |
| 4,785,573 A | * | 11/1988 | Millard ........................ | 43/112 |
| 4,856,226 A | * | 8/1989 | Taylor ......................... | 43/113 |
| 4,858,376 A | * | 8/1989 | Reed ........................... | 43/139 |
| 4,907,366 A | * | 3/1990 | Balfour ..................... | 43/132.1 |
| 4,908,978 A | * | 3/1990 | Zacharias .................... | 43/111 |
| 5,014,460 A | * | 5/1991 | Patti et al. ................... | 43/113 |
| 5,157,865 A | * | 10/1992 | Chang ......................... | 43/113 |
| 5,167,090 A | * | 12/1992 | Cody ........................... | 43/139 |
| 5,205,064 A | * | 4/1993 | Nolen .......................... | 43/112 |
| 5,205,065 A | * | 4/1993 | Wilson et al. ................ | 43/113 |
| 5,323,556 A | * | 6/1994 | Carle ........................... | 43/139 |
| 5,327,675 A | * | 7/1994 | Butler et al. ................. | 43/113 |
| 5,329,725 A | * | 7/1994 | Bible ........................... | 43/113 |
| 5,382,422 A | * | 1/1995 | Dieguez et al. .............. | 43/111 |
| 5,417,009 A | * | 5/1995 | Butler et al. ................. | 43/113 |
| 5,647,164 A | * | 7/1997 | Yates ........................... | 43/139 |
| 5,669,176 A | * | 9/1997 | Miller .......................... | 43/139 |
| 5,799,436 A | * | 9/1998 | Nolen et al. ................. | 43/112 |
| 5,813,166 A | * | 9/1998 | Wigton et al. ............... | 43/107 |
| 6,055,766 A | * | 5/2000 | Nolen et al. ................. | 43/112 |
| 6,134,826 A | * | 10/2000 | Mah ............................ | 43/112 |
| 6,145,243 A | * | 11/2000 | Wigton et al. ............... | 43/139 |
| 6,199,316 B1 | * | 3/2001 | Coventry ................... | 43/132.1 |

(Continued)

FOREIGN PATENT DOCUMENTS

AU          9944477 A1  *  3/2000

(Continued)

*Primary Examiner*—Darren W. Ark
(74) *Attorney, Agent, or Firm*—Peter Loffler

(57) ABSTRACT

A trap for catching mosquitoes uses a plurality of housings that are disposed along a perimeter to be protected against the mosquitoes. Each housing has a heat source, a mesh for trapping the insects, and a fan to pull the insects into the mesh. A first container holds carbon dioxide while a second container holds octenol. The carbon dioxide is pumped through the octenol holding container and the combined carbon dioxide and octenol are passed are mixed and enter a first conduit. Each housing is fluid flow connected to the first conduit and some of the combined carbon dioxide and octenol passes to each housing in order to act as attractants for the insects. A second conduit runs parallel to the first conduit and carries electricity such that when each housing attaches to the first conduit it also attaches to the second conduit in order to provide an electrical connection to the housing's fan and light.

18 Claims, 4 Drawing Sheets

U.S. PATENT DOCUMENTS

| | | | |
|---|---|---|---|
| 6,272,790 B1 * | 8/2001 | Paganessi et al. | 43/107 |
| 6,286,249 B1 * | 9/2001 | Miller et al. | 43/139 |
| 6,467,215 B1 * | 10/2002 | Nelson et al. | 43/107 |
| 6,516,559 B1 * | 2/2003 | Simchoni et al. | 43/107 |
| 6,530,172 B2 * | 3/2003 | Lenz | 43/112 |
| 6,568,123 B2 * | 5/2003 | Nelson et al. | 43/107 |
| 6,570,494 B1 * | 5/2003 | Leftridge, Sr. | 43/107 |
| 6,655,080 B2 * | 12/2003 | Spiro et al. | 43/139 |
| 6,718,685 B2 * | 4/2004 | Bossler | 43/107 |
| 2002/0108296 A1 * | 8/2002 | Kleinhenz | 43/139 |
| 2002/0129539 A1 * | 9/2002 | Brunet | 43/112 |
| 2004/0025412 A1 * | 2/2004 | Simchoni et al. | 43/107 |
| 2004/0103579 A1 * | 6/2004 | Nolen et al. | 43/107 |
| 2004/0128904 A1 * | 7/2004 | Chen | 43/139 |

FOREIGN PATENT DOCUMENTS

| | | | |
|---|---|---|---|
| CA | 2073163 B1 * | 1/1994 | |
| JP | 7-203821 B1 * | 8/1995 | |
| JP | 8-56543 B1 * | 3/1996 | |
| JP | 8-154553 B1 * | 6/1996 | |
| JP | 10-229801 B1 * | 9/1998 | |
| WO | WO-89/12389 A1 * | 12/1989 | |
| WO | WO-92/17060 A1 * | 4/1992 | |

* cited by examiner

INSECT TRAP SYSTEM

BACKGROUND OF THE INVENTION

1. Field of the Invention

The present invention relates to an insect trap for trapping and killing flying insects such as mosquitoes and no-see-ums, which invention dispatches an attractant, namely carbon dioxide and octenol, in order to draw the mosquitoes in, and thereafter traps and kills the insects.

2. Background of the Prior Art

Most people hate mosquitoes. Besides the annoyance, the itching, and the resulting infections of their bites, mosquitoes carry diseases such as malaria, yellow fever, dengue fever, encephalitis, and West Nile virus. Numerous control methods have been used including body coverings and coatings, fans, nets, zappers, and slapping and swatting the varmints. However, such methods may be uncomfortable to implement for the user or offer no more than short-term help while some methods do not work whatsoever and some methods are dangerous.

Several years ago, the U.S. Coast guard, tired of wrestling with mosquitoes, no-see-ums, and other biting bugs that infested their stations, commissioned entomologists at the University of Florida to research how these insects locate us in order to bite us so that control methods might be improved.

It has been known for some time that the female mosquito requires a blood meal in order to obtain protein that is necessary for laying eggs, which blood she obtains by biting.

Humans, other mammals, and birds inhale air and exhale, among other things, carbon dioxide ($CO_2$) and octenol, a byproduct of the digestive process. While there are other odors that are attractants to these insects—foot odor, which has a molecule similar to that found in Limburger cheese, is one such mild attractant—carbon dioxide and octenol are by far the most attractive. Heat in the range of human body temperature and dark colors are also attractants.

Mosquitoes have heat receptors and odor receptors on their heads in order to assist them in finding us so that they can get their blood meal from us. The odor receptors can pick up the attractive odors as far away as 135 feet downwind from the source of the odor. The mosquito flies upwind until she is about 25 feet away at which time the heat receptors guides her in for a landing—and a lunch.

Building on this research, a number of prior art devices have been proposed. Most such prior art devices use either $CO_2$, octenol, or both as an odor attractant, while some also use heat as an attractant, although none are known to use old tennis shoes. Devices that use $CO_2$ either use commercially available $CO_2$ or produce the $CO_2$ by burning propane. Devices that produce heat typically produce the heat by using 110-volt electric heat strips or by burning propane. The insects are killed by either retaining them in a bag and desiccating them, trapping them on a sticky substance such as flypaper, or by zapping them with a high-voltage bug zapper.

The prior art devices suffer from one or more drawbacks. Untended propane fires that are used to produce $CO_2$ and heat are potentially dangerous. Not only can a fire spread from the burning propane, regulators, valves and hoses, but the propane tanks can explode. Further, burning propane and other gasses in order to produce $CO_2$ contributes to airborne pollution and global warming. $CO_2$ from bottles is obtained from and released back to the atmosphere, thereby avoiding adding more $CO_2$ to the atmosphere.

The bug zappers explode all insects that come into contact with them. While they do zap mosquitoes and no-see-ums, they also kill other (possibly desirable) insects. Additionally, adding zapped bug parts to the family barbecue and to the air that is breathed is neither recommended nor desired. The use of high voltage electricity outdoors can be dangerous if not properly installed and maintained, especially in the rain and around pools. Along with killing the insects, such devices have the potential to kill the user as well. Many prior art devices are unusually complex in design and construction, making such devices relatively expensive to manufacture and to maintain, thus less attractive to the consumer market.

Therefore, there exists a need in the art for an insect killer that overcomes the above-stated problems found in the art. Such a device must eliminate the need for the use of propane for any reason. The device must be substantially targeted at killing the bad insects, namely mosquitoes, while not acting as an attractant to good insects which are not to be killed. The device must not add unwanted materials to food found in the area of the device or to the surrounding air. The device must not rely on a source of high voltage for its operation. Ideally, the device must be simple in design and construction so that it is relatively easy to manufacture so as to make the device relatively inexpensive and thus attractive to a large section of the consumer market.

SUMMARY OF THE INVENTION

The insect trap system of the present invention addresses the aforementioned needs in the art. The insect trap system eliminates the need for the use of propane. The insect trap system targets only bad (blood feeding) insects, primarily mosquitoes, while it does not target the good insects. The insect trap system does not explode the insects that it kills. The insect trap system relies on low voltage for proper operation, thereby eliminating the need for a source of dangerous high voltage. The insect trap system is simple in design and construction so that it is relatively easy to construct, making the device relatively inexpensive and thus attractive to a large section of the consumer market.

The insect trap system of the present invention is comprised of a first storage receptacle having a first insect attractant, namely $CO_2$, held therein, and a second storage receptacle having a second insect attractant, namely octenol, held therein. A first conduit has a first end attached to the second receptacle and has a second end. A plurality of housings are provided such that each housing has an opening, a light attached to the housing, a mesh disposed within the housing below the opening, a second conduit having a third end attached to the housing and a fourth end, and a fan attached to the housing and disposed below the mesh, such that the fan draws air through the mesh and the light, via the heat produced, attracts the insect into opening of the housing and the fan pulls the insect into the mesh. The fourth end of the second conduit of each housing is attached to first conduit in order to establish fluid flow between the first conduit and each such second conduit, and wherein the first attractant is pumped from the first receptacle through the second receptacle and mixed with the second attractant such that the combined first attractant and the second attractant are passed through the first conduit and some of the combined first attractant and the second attractant pass through each second conduit that is fluid flow connected to the first conduit and released at the third end of each such second conduit. The light and the fan within each housing are each connected to a 12-volt DC electric source for operational electric power. The mesh within each of the plurality of housings is removable for cleaning and thereafter replaceable within the housing. The second end of the first conduit is capped. A third conduit is provided and has a fifth end attached to a source of electric power and a sixth end, the third conduit being attached to the first conduit along a substantial portion of the first conduit. A plurality of fourth conduits are provided, each fourth conduit has a seventh end electrically attached to the motor and the fan of a respective one of the plurality of housings and each fourth conduit also has an eighth end electrically attached to the third conduit. The fourth end of the each second conduit is fluid flow attached to the first conduit by providing a first needle punch on the fourth end of each such second conduit such that the first needle punch punches through the first conduit and is held thereat by providing a lock clamp that holds the fourth end of the second conduit against the first conduit with the first needle punch remaining within the first conduit, and the eighth end of the each fourth conduit is electrically attached to the third conduit by providing a second needle punch on the eighth end of each such fourth conduit such that the second needle punch punches through the third conduit and is held thereat by the actions of the lock clamp that holds the eighth end of the fourth conduit against the third conduit with the second needle punch remaining in electrical contact with the third conduit. The third conduit carries the 12-volt DC supply of electricity.

BRIEF DESCRIPTION OF THE DRAWINGS

Similar reference numerals refer to similar parts throughout the several views of the drawings.

DESCRIPTION OF THE PREFERRED EMBODIMENT

Figure 1:
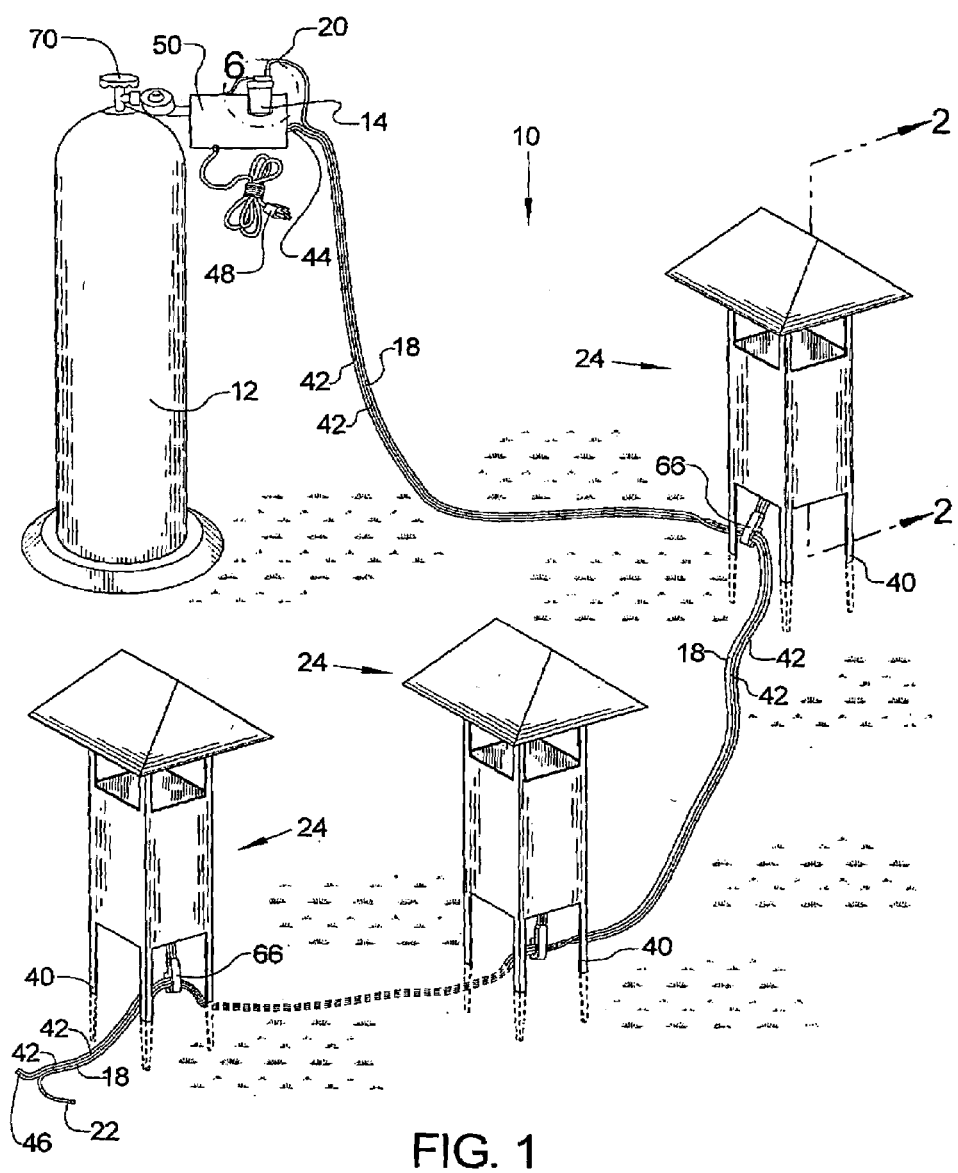
FIG. 1 is an environment view of the insect trap system of the present invention.
Figure 2:
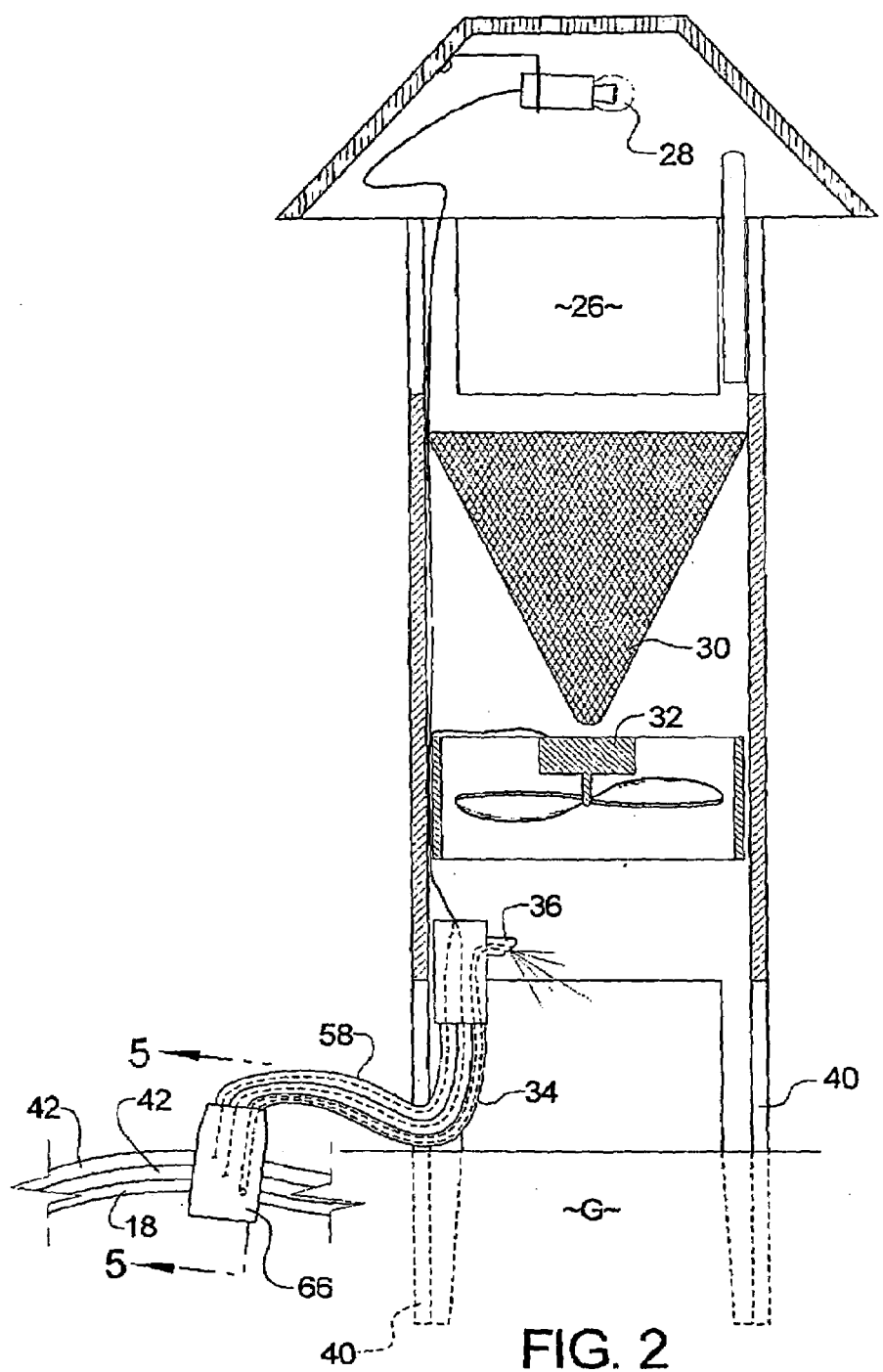
FIG. 2 is a sectioned view, taken along line 2—2 in FIG. 1, of an individual insect trap used with the insect trap system of the present invention.
Figure 3:
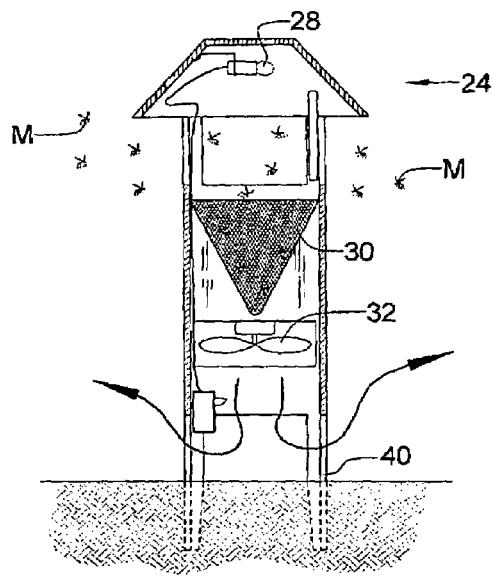
FIG. 3 is a sectioned view of the individual insect trap of FIG. 2 while the insect trap is operational.

Referring now to the drawings, it is seen that the insect trap system of the present invention, generally denoted by reference numeral 10, is comprised of a first storage receptacle 12 which holds a first insect attractant, namely $CO_2$. This receptacle 12 can be any standard compressed gas holder for holding compressed $CO_2$ therein. A second storage receptacle 14 holds a second insect attractant, namely octenol 16. A first conduit 18 has a first end 20 attached to the second receptacle 14 and has a second end 22 that is capped. If the first conduit 18 is a complete closed loop, the second end 22 of the first conduit 18 is substantially next to the first end 20, and if the first conduit has a partial closed loop, the second end 22 can be defined as the closed loop.

Figure 4:
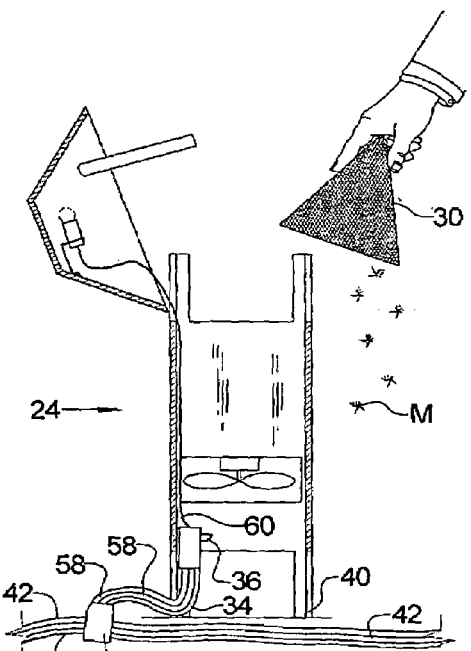
FIG. 4 is a sectioned view of the individual insect trap of FIG. 2, illustrating the cleaning process for cleaning the mesh.
Figure 5:
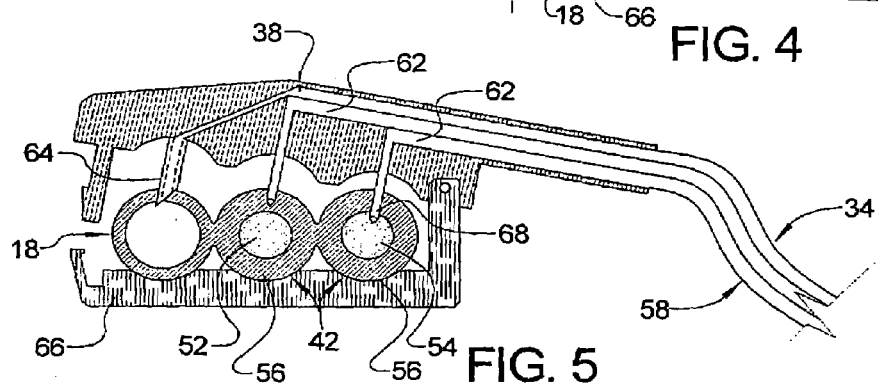
FIG. 5 is a sectioned view, taken along line 5—5 in FIG. 2, of the electrical conduit and attractant conduit bus, with an individual insect trap being connected to the bus.
Figure 6:
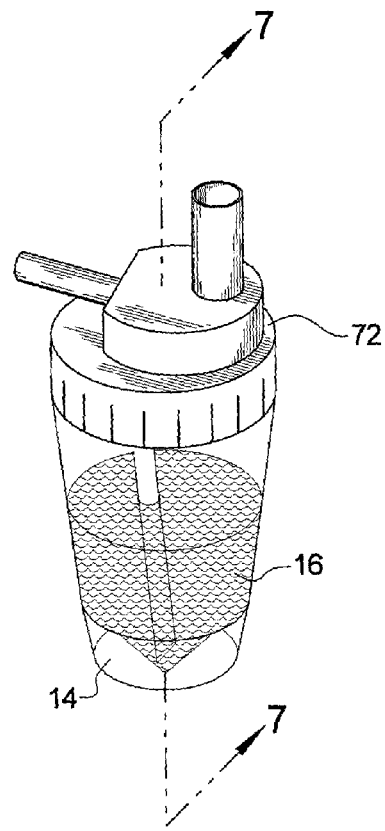
FIG. 6 is an enlarged view of the detail area of FIG. 1 illustrating the nebulizer.
Figure 7:
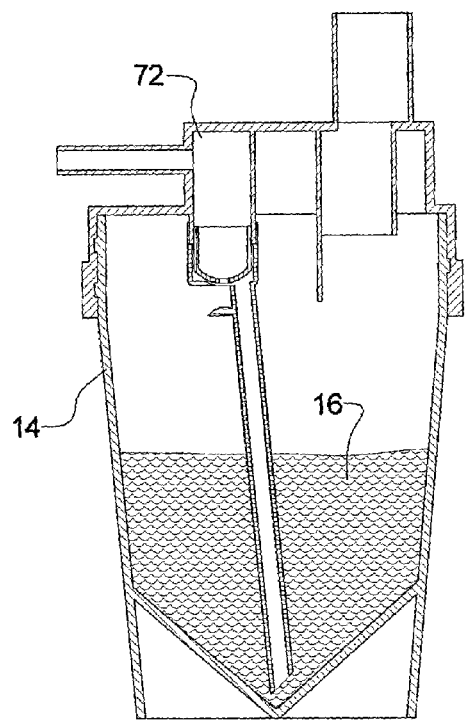
FIG. 7 is a sectioned view, taken along line 7—7 in FIG. 6, of the nebulizer.

A plurality of housings 24 are provided such that each housing 24 has an opening 26, a light 28 attached to the housing 24, a mesh 30 disposed within the housing 24 below the opening 26, and a fan 32 attached to the housing 24 and disposed below the mesh 30. A second conduit 34 is provided and has a third end 36 attached to the housing 24 and a fourth end 38. The fourth end 38 of the second conduit 34 is fluid flow attached to the first conduit 18. The housings 24 may have any configuration such as the illustrated landscape light configuration and may have appropriate stakes 40 for securing each housing 24 within the ground G. Access is provided within the housing 24 so that the mesh 30 may be removed, cleaned, and thereafter replaced, which can be achieved by pivotally attaching the upper portion of the housing 24 to its lower portion, as best illustrated in FIG. 4.

A third conduit 42 is provided and has a fifth end 44 connected to a source of electric power and a sixth end 46, the third conduit 42 being attached to the first conduit 18 along a substantial portion of the first conduit 18, such that the first conduit 18 and the third conduit 42 run attached and parallel along a substantial portion of the length of each. The third conduit 42 is connected to the source of electric power in any standard fashion such as by providing a plug 48 and plugging the plug 48 into a standard wall socket (not illustrated). An appropriate transformer 50 is disposed between the plug 48 and the third conduit 42 so that the third conduit 42 carries much less than the typical 110-volt AC power provided by the standard wall socket, namely, the third conduit 42 carries 12-volt DC power, or some similar electric power amount. As seen, the third conduit 42 holds both a positive wire 52 and a negative wire 54, each having appropriate insulation 56.

A fourth conduit 58 has a seventh end 60 electrically attached to the fan 32 and the light 28 and an eighth end 62 that is electrically attached to the third conduit 42.

The fourth end 38 of the each second conduit 34 is fluid flow attached to the first conduit 18 by providing a first needle punch 64 on the fourth end 38 of each such second conduit 34 such that the first needle punch 64 punches through the first conduit 18 and is held thereat by providing a lock clamp 66, of any appropriate design, that holds the fourth end 38 of the second conduit 34 against the first conduit 18 with the first needle punch 64 remaining within the first conduit 18, and the eighth end 62 of the each fourth conduit 58 is electrically attached to the third conduit 42 by providing a second needle punch pair 68 (a pair is needed, one for the positive wiring and the other for the negative wiring) on the eighth end 62 of each such fourth conduit 58 such that the second needle punch pair 68 punches through the third conduit 58 until the second needle punch pair 68 make electrical contact with each of the pair's respective wires within the third conduit 42, the second needle punch pair 68 held thereat by the lock clamp 66 that holds the eighth end 62 of the fourth conduit 58 against the third conduit 42 with the second needle punch pair 68 remaining in electrical contact with the third conduit 42 by the actions of the lock clamp 66.

In order to use the insect trap system 10 of the present invention, the first receptacle 12 is filled with $CO_2$ in appropriate fashion. The second receptacle 14 is filled with octenol 16 and is fluid flow attached to first receptacle 12. The combined first conduit 18 and third conduit 42 are spread about the perimeter of an area to be protected against mosquitoes. The first end 20 of the first conduit 18 is fluid flow connected to the second receptacle 14, while the plug 48 is plugged in so as to provide electrical energy along the third conduit 42. Each housing 24 is secured to the ground G at a desired location, and the fourth end 38 of the second conduit 34 is fluid flow connected to the first conduit 18, while the eighth end 62 of the fourth conduit 58 is electrically connected to the third conduit 42. This process is repeated for each housing 24 used until a desired perimeter is established. Thereafter, the system is energized such that electricity flows through the third conduit 42 allowing the light 28 and the fan 32 within each housing 24 that is electrically coupled to the third conduit 42 to become activated. Additionally, the $CO_2$ is pumped from the first receptacle 12 through the second receptacle 14 wherein it is mixed with the octenol 16 held therein. The combined $CO_2$ and octenol 16 are thereafter pumped through the first conduit 18. Some of the combined $CO_2$ and octenol 16 enter each second conduit 34 that is attached to the first conduit 18, wherein the combined $CO_2$ and octenol exit out of the third end 36 of each such second conduit 34. The combined $CO_2$ and octenol 16 act as a long range attractant to the mosquitoes M, while the heat produced by the light 28 acts as a short range attractant. Once the mosquitoes M are at a housing 24, they enter the opening 26 of the housing 24 and are pulled into the mesh 30 by the fan 32, wherein they are eventually desiccated by the lack of water. As the housings 24 are located along a perimeter, the area within the perimeter is protected from the mosquitoes M by the actions of the system 10. The combined $CO_2$ and octenol 16 are pumped through the system by the compressive pressure within the first receptacle 12, with the control knob 70 provided on the first receptacle 12 acting as an on/off switch for pumping the $CO_2$. If desired, a nebulizer 72, of any appropriate design, can be interspersed between the second receptacle 14 and the first conduit 18, such that the combined $CO_2$ and the octenol 16 are nebulized through the system 10. This allows for good mixing of the $CO_2$ and the octenol 16, although various other methods of combining the $CO_2$ and the octenol 16 can be incorporated.

If desired, a master on/off switch can be provided proximate the transformer 50 for control of the electric power through the system 10, and/or each housing 24 may have an individual on/off switch for electrically controlling the light 28 and the fan 32.

While the invention has been particularly shown and described with reference to an embodiment thereof, it will be appreciated by those skilled in the art that various changes in form and detail may be made without departing from the spirit and scope of the invention.

We claim:

1. A trap for catching an insect, the trap comprising:
a housing having an opening;
a light attached to the housing;
a mesh disposed within the housing below the opening;
a fan attached to the housing and disposed below the mesh, such that the fan draws air from the mesh;
a first storage receptacle having a first insect attractant held therein;
a second storage receptacle having a second insect attractant held therein;
a conduit having a first end attached to the second receptacle and a second end attached to the housing; and
wherein the first attractant is pumped from the first receptacle through the second receptacle and mixed with the second attractant such that the combined first attractant and the second attractant are passed through the conduit and released at the second end of the conduit and wherein the light and/or heat from the light attracts the insect into opening of the housing and the fan pulls the insect into the mesh.

2. The trap as in claim 1 wherein the light and the fan are each connected to a 12-volt DC electric source for operational electric power.

3. The trap as in claim 1 wherein the mesh is removable for cleaning and thereafter replaceable within the housing.

4. The trap as in claim 1 wherein the first attractant is $CO_2$ and the second attractant is octenol.

5. The trap as in claim 1 further comprising a nebulizer disposed between the second receptacle and the conduit such that the combined first attractant and the second attractant pass through the nebulizer before entering the conduit.

6. The trap as in claim 1 wherein the housing has a stake for securing the housing to the ground.

7. A trap for catching an insect, the trap comprising:
a first storage receptacle having a first insect attractant held therein;
a second storage receptacle having a second insect attractant held therein;
a first conduit having a first end attached to the second receptacle and a second end;
a plurality of housings, each housing having an opening, a light attached to the housing, a mesh disposed within the housing below the opening, a second conduit having a third end attached to the housing and a fourth end, and a fan attached to the housing and disposed below the mesh, such that the fan draws air from the mesh, such that the light and/or heat from the light attracts the insect into the opening of the housing and the fan pulls the insect into the mesh;
wherein the fourth end of the second conduit of each housing is attached to the first conduit in order to establish fluid flow between the first conduit and the second conduit, and wherein the first attractant is pumped from the first receptacle through the second receptacle and mixed with the second attractant such that the combined first attractant and the second attractant are passed through the first conduit and some of the combined first attractant and the second attractant pass through each said second conduit that is fluid flow connected to the first conduit and released at the third end of each said second conduit.

8. The trap as in claim 7 wherein the first attractant is $CO_2$ and the second attractant is octenol.

9. The trap as in claim 7 further comprising a nebulizer disposed between the second receptacle and the first conduit such that the combined first attractant and the second attractant pass through the nebulizer before entering the first conduit.

10. The trap as in claim 7 wherein the light and the fan within each housing are each connected to a 12-volt DC electric source for operational electric power.

11. The trap as in claim 7 wherein the mesh within each of the plurality of housings is removable for cleaning and thereafter replaceable within the housing.

12. The trap as in claim 7 wherein the second end of the first conduit is capped.

13. The trap as in claim 7 wherein the fourth end of each second conduit is fluid flow attached to the first conduit by providing a needle punch on the fourth end of each second conduit such that the needle punch punches through the first conduit and is held thereat by providing a lock clamp that holds the fourth end of the second conduit against the first conduit with the needle punch remaining within the first conduit.

14. The trap as in claim 7 further comprising:
- a third conduit having a fifth end attached to a source of electric power and a sixth end, the third conduit being attached to the first conduit along a portion of the first conduit;
- a plurality of fourth conduits, each fourth conduit having a seventh end electrically attached to the motor and the fan of a respective one of the plurality of housings, each fourth conduit also having an eighth end electrically attached to the third conduit.

15. The trap as in claim 14 wherein the fourth end of each second conduit is fluid flow attached to the first conduit by providing a first needle punch on the fourth end of each second conduit such that the first needle punch punches through the first conduit and is held thereat by providing a lock clamp that holds the fourth end of the second conduit against the first conduit with the first needle punch remaining within the first conduit, and wherein the eighth end of each fourth conduit is electrically attached to the third conduit by providing a second needle punch on the eighth end of each fourth conduit such that the second needle punch punches through the third conduit and is held thereat by actions of the lock clamp that holds the eighth end of the fourth conduit against the third conduit with the second needle punch remaining in electrical contact with the third conduit.

16. The trap as in claim 14 wherein the third conduit carries a 12-volt DC supply of electricity.

17. The trap as in claim 14 wherein the housing has a stake for securing the housing to the ground.

18. The trap as in claim 7 wherein the housing has a stake for securing the housing to the ground.

* * * * *